(12) United States Patent
Supnekar et al.

(10) Patent No.: US 10,386,004 B2
(45) Date of Patent: Aug. 20, 2019

(54) FLOW CONTROL VALVE

(71) Applicants: Subhash V. Supnekar, Pune (IN); Trishul S. Supnekar, Pune (IN)

(72) Inventors: Subhash V. Supnekar, Pune (IN); Trishul S. Supnekar, Pune (IN)

( * ) Notice: Subject to any disclaimer, the term of this patent is extended or adjusted under 35 U.S.C. 154(b) by 0 days.

(21) Appl. No.: 15/502,968

(22) PCT Filed: Oct. 19, 2015

(86) PCT No.: PCT/IN2015/000395
§ 371 (c)(1),
(2) Date: Feb. 9, 2017

(87) PCT Pub. No.: WO2016/067304
PCT Pub. Date: May 6, 2016

(65) Prior Publication Data
US 2017/0227158 A1 Aug. 10, 2017

(30) Foreign Application Priority Data

Oct. 29, 2014 (IN) .......................... 3421/MUM/2014

(51) Int. Cl.
| | |
|---|---|
| *F16K 3/08* | (2006.01) |
| *F16L 55/027* | (2006.01) |
| *F01P 7/16* | (2006.01) |
| *F16F 9/348* | (2006.01) |
| *F16K 27/02* | (2006.01) |

(52) U.S. Cl.
CPC ........... *F16L 55/02709* (2013.01); *F01P 7/16* (2013.01); *F16F 9/348* (2013.01); *F16K 3/08* (2013.01); *F16K 27/02* (2013.01); *Y10T 137/86743* (2015.04)

(58) Field of Classification Search
USPC ..................................................... 137/625.31
See application file for complete search history.

(56) References Cited

U.S. PATENT DOCUMENTS

| | | | | |
|---|---|---|---|---|
| 4,098,294 A | * | 7/1978 | Woods | ...................... F15D 1/00 |
| | | | | 137/614.11 |
| 4,557,288 A | | 12/1985 | Botnick | |
| 4,674,537 A | * | 6/1987 | Bergmann | .............. F16K 3/085 |
| | | | | 137/625.31 |
| 4,862,915 A | * | 9/1989 | Renfro | .................... E21B 34/02 |
| | | | | 137/556 |

(Continued)

FOREIGN PATENT DOCUMENTS

WO 2013/159276 A1 10/2013

OTHER PUBLICATIONS

International Search Report and Written Opinion dated Jun. 3, 2016, in International Patent Application No. PCT/IN2015/00395, filed Oct. 19, 2015.

*Primary Examiner* — John Fox
(74) *Attorney, Agent, or Firm* — Wiley Rein LLP

(57) ABSTRACT

Disclosed is a flow control valve 100. The flow control valve 100 comprises a cylindrical body 20, a piston 40, at least one fluid seal 60, a handle 60 and a nut 90. The flow control valve 100 is connected between an inlet and an outlet of a pipe to control flow of liquid/gases passing there through even at high temperature and pressure. The flow control valve 100 provides good force to the liquid/gas passing there through and provides an equal distribution of the flow at the outlet without resulting in pressure drop.

11 Claims, 6 Drawing Sheets

(56) References Cited

U.S. PATENT DOCUMENTS

| | | | | |
|---|---|---|---|---|
| 5,025,832 A * | 6/1991 | Taylor | ............... | F16K 3/085 |
| | | | | 137/625.31 |
| 5,127,438 A * | 7/1992 | Williams | ............ | F16K 3/085 |
| | | | | 137/562 |
| 6,273,132 B1 * | 8/2001 | Chrysler | ............ | E03B 9/025 |
| | | | | 137/360 |
| 9,476,509 B2 * | 10/2016 | Tuineag | ............ | F16K 3/085 |
| 9,835,257 B2 * | 12/2017 | Tuineag | ............ | F16K 3/085 |

* cited by examiner

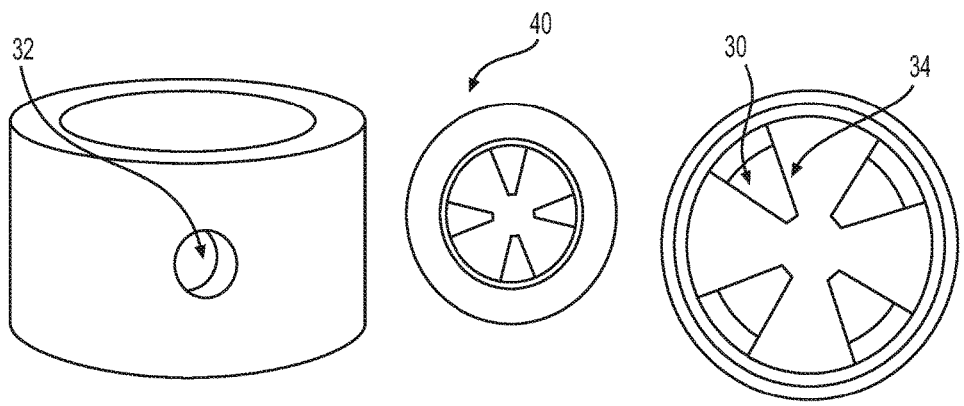
FIG. 2A  FIG. 2B  FIG. 2C
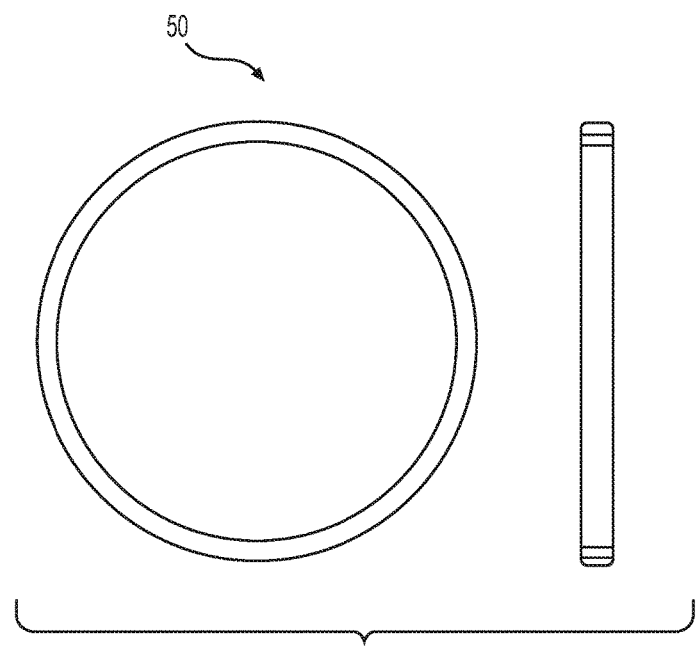
FIG. 3

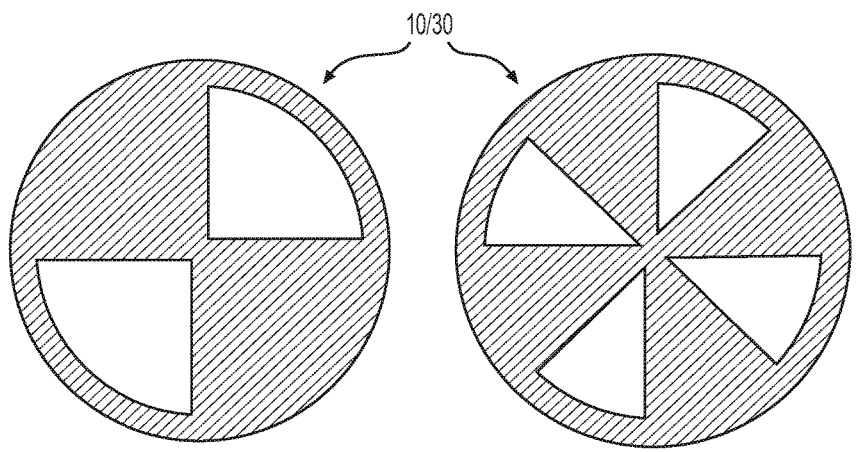
FIG. 6A  FIG. 6B
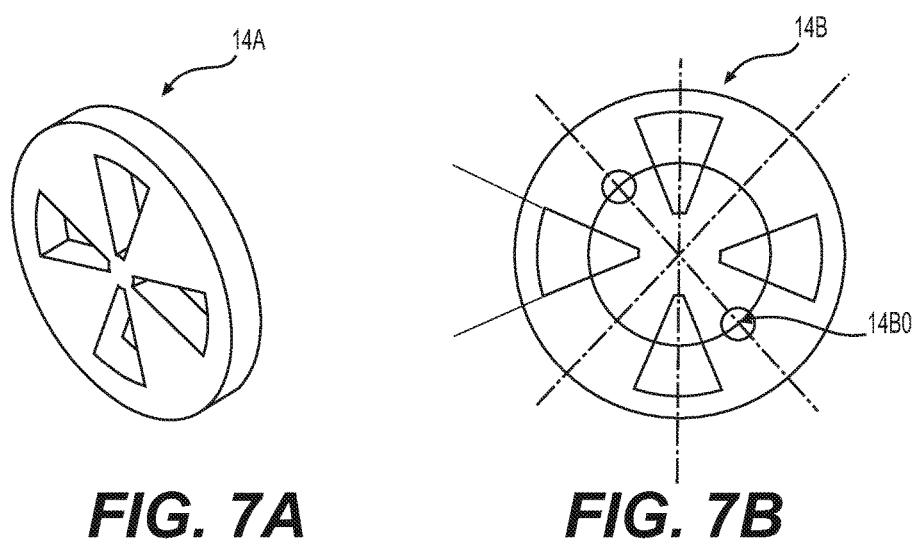
FIG. 7A  FIG. 7B

FLOW CONTROL VALVE

RELATED APPLICATIONS

This Application is a § 371 National Stage Application of PCT/IN2015/000395, filed Oct. 19, 2015, which claims priority benefit of Indian Application No. 3421/MUM/2014, filed Oct. 29, 2014, which applications are incorporated entirely by reference herein for all purposes.

FIELD OF THE INVENTION

The present invention relates to a valve and more particularly, to a cylindrical circular slice valve for controlling flow of liquid or gas within a pipeline even under high pressure and temperature.

BACKGROUND OF THE INVENTION

Valves have been used for centuries in many different ways to control the flow of fluids/gases. With the progress of fluid technology especially since the industrial revolution, a great variety of uses have been found for valves. Some of these uses may include pneumatic and motor-driven actuation with controllers that are regulated by a computer. By and large, however, the basic flow design of valves has stayed relatively constant along some of these basic lines as mentioned below.

Currently, various types of valves are in use. One such valve is a gate valve. The gate valve also known as lift valves is a valve that opens by lifting a round or rectangular gate/wedge out of the path of the fluid. The gate valve typically contains a circular disc or a slice known as the gate. The circular disc or slice is mounted perpendicular to the pipe containing the fluid/gas. The reciprocal actuation guides the gate up and down into the seat of the valve to either open the flow path for full flow or to close it down.

Another valve that is in use is a globe valve. The globe valves are very good at throttling, but with reduced flow capabilities. The path of the fluid through the globe valve is tortuous, and as a result, these valves do not allow as much fluid flow for a given size as the other basic valve designs.

Yet another kind of valve in use is a ball valve, which is most popular today. In the ball valve, the valve actuator is connected by a valve stem to a ball inside the valve. The ball has a large hole bored inside of it from one side to the other. Rotating the ball allows for this hole to be aligned with the incoming and outgoing flow path. In the closed position, the ball opening is rotated perpendicular to the flow path and completely shuts off the flow of fluid.

One more type of valve in use presently is a check valve. A typical example of a check valve is a diaphragm check valve which uses a flexing rubber diaphragm positioned to create a normally-closed valve. Pressure on the upstream side must be greater than the pressure on the downstream side by a certain amount, known as the pressure differential, for the check valve to open allowing flow. Once positive pressure stops, the diaphragm automatically flexes back to its original closed position. Pressure on the upstream side must be greater than the pressure on the downstream side by a certain amount, known as the pressure differential, for the check valve to open for allowing flow. Once positive pressure stops, the diaphragm automatically flexes back to its original closed position.

All the above mentioned valves have disadvantage that they have resistance in the flow because of change in direction of the flow. For example, in the ball valve or the gate valve, the angle of flow is shifted when the valve is not fully open.

Accordingly, there exists a need to provide a flow controlling device which overcomes the above mentioned drawbacks of the prior art.

OBJECTS OF THE INVENTION

An object of the present invention is to provide a flow control valve that controls flow of liquid/gases passing there through even at high temperature and pressure.

Yet another object of the present invention is to provide the flow control valve that provides good force to the liquid/gas passing there through and equally distributing the flow at the outlet.

SUMMARY OF THE INVENTION

Accordingly, the present invention provides a flow control valve. The flow control valve comprises a cylindrical body, a piston, at least one fluid seal, a handle and a nut.

The cylindrical body is connected between an inlet and an outlet of a pipe for controlling the flow of liquids/gases there through. The cylindrical body includes a connector such as a flange fitted on both ends thereof for fitting into the inlet and the outlet of the pipe. The cylindrical body includes a slit configured centrally thereon and a first disc configured internally therein. The first disc includes at least one cavity configured therein. The first disc is an integral part of the cylindrical body formed by a method such as a casting/machining method. The first disc is fixed on an internal diameter of the cylindrical body by any one of an interference fit method, a welding method and a resin binding method.

The first disc is selected from any one of a stationary disc and a flying disc. The flying disc includes at least two guide holes configured thereon. The flying disc is adapted to undergo reciprocating movement in response to an in-line fluid pressure. The cylindrical body having the flying disc is designed to include a bridge plate. The bridge plate includes at least two guide pins fixed thereon for allowing the flying disc to undergo reciprocating movement by sliding therein through the at least two holes.

The piston is fitted inside the cylindrical body for moving therein. The piston includes a hole configured centrally thereon and a second disc configured internally therein. The hole is adapted for coinciding with the slit on the cylindrical body. The second disc is configured to rest on the first disc leaving a gap there between. The second disc is an integral part of the piston formed by the method such as the casting/machining method. The second disc is fixed on the internal diameter of the piston by any one of the interference fit method, the welding method and the resin binding method. The first disc and the second disc are flat circular metal discs.

The second disc includes at least one cavity configured therein. The second disc is capable of undergoing a circular movement in response to the movement of the piston resulting in any one of partial alignment, complete alignment and complete misalignment of the at least one cavities with each other for controlling the flow of fluid/gas flowing there through from the inlet to the outlet of the pipe.

The at least one fluid seal is positioned between the internal diameter of the cylindrical body and the second disc of the piston. The handle is adapted for interconnecting the piston with the cylindrical body by passing through the slit on the cylindrical body into the hole of the piston. The handle is capable of being moved by any one of a manual means and an actuator device for moving the piston therewith thereby resulting in the circular movement of the second disc. The nut is adapted for locking the piston inside the cylindrical body. The nut is fixed on top of bearings inside the cylindrical body. The bearings are threadbly positioned on top of the piston inside the cylindrical body.

BRIEF DESCRIPTION OF THE DRAWINGS

The objectives and advantages of the present invention will become apparent from the following description read in accordance with the accompanying drawings wherein:

FIG. 2A, FIG. 2B, and FIG. 2C, respectively, show a front view, a top view, and a bottom view of a piston with an integrated second disc of the flow control valve of FIG. 1A.

FIG. 3 shows a fluid seal of the flow control valve of FIG. 1A.

FIG. 6A and FIG. 6B respectively show two cavity and four cavity variants of a first/second disc of the flow control valve of FIG. 1A.

FIG. 7A shows a three dimensional view of a stationary disc of the flow control valve of FIG. 1A; FIG. 7B shows a front view of the flying disc of the flow control valve of FIG. 1A.

DETAILED DESCRIPTION OF THE INVENTION

Figure 1A:
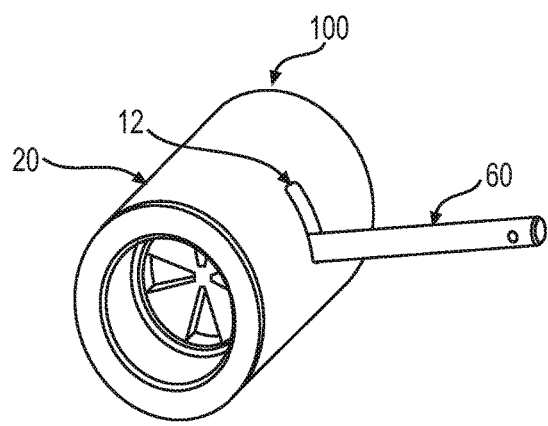
FIG. 1A shows a flow control valve, in accordance with the present invention.
Figure 1B:
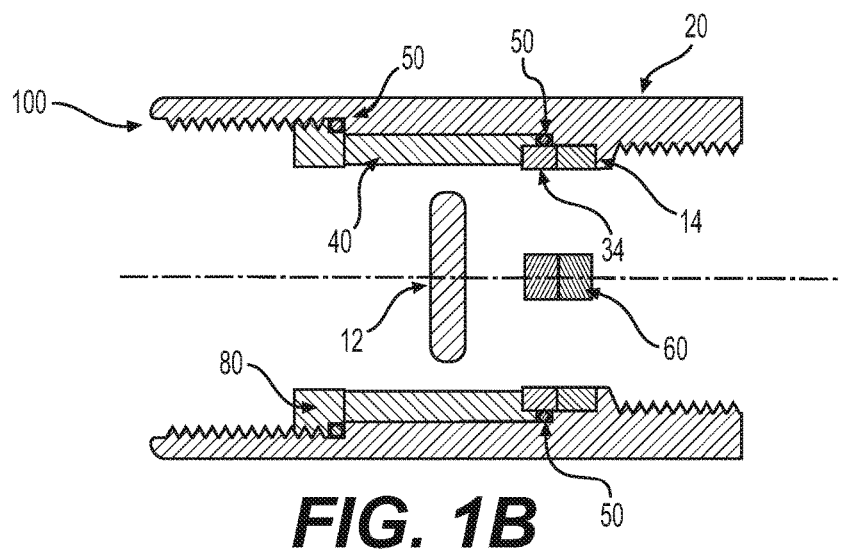
FIG. 1B shows a cross-sectional view the flow control valve of FIG. 1A.
Figure 4:
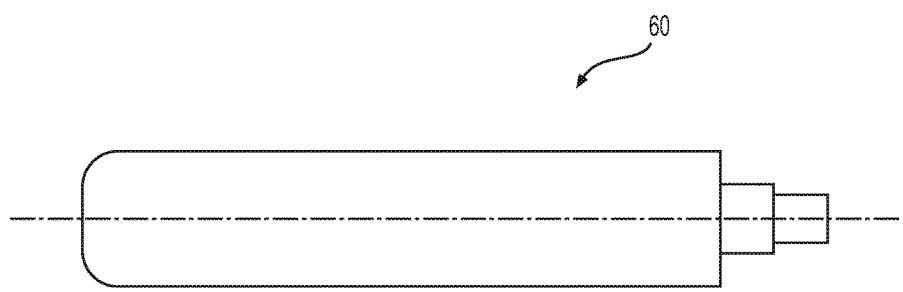
FIG. 4 shows a handle of the flow control valve of FIG. 1A.
Figure 5:
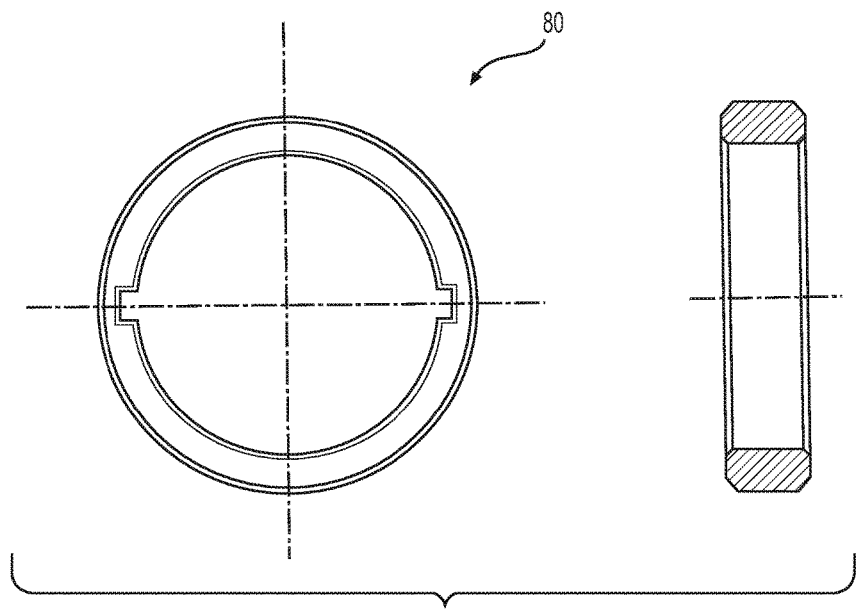
FIG. 5 shows a nut of the flow control valve of FIG. 1A.

The foregoing objects of the present invention are accomplished and the problems and shortcomings associated with the prior art, techniques and approaches are overcome by the present invention as described below in the preferred embodiment.

The present invention provides a flow control valve. The flow control valve controls flow of liquid/gases passing there through even at high temperature and pressure. The flow control valve provides good force to the liquid/gas passing there through and provides an equal distribution of the flow at the outlet.

Referring now FIG. 1A-FIG. 9C, a flow control valve 100 (hereinafter the valve 100) is shown in accordance with the present invention. The valve 100 is connected between an inlet (not shown) and an outlet (not shown) of a pipe (not shown) for controlling the flow of liquids/gases there through. Specifically, the valve 100 is a cylindrical circular slice valve connected to the pipe selected from fuel pipelines, water pipelines, gas pipelines, semisolid fluid pipelines, irrigation pipelines and the like. The valve 100 comprises a cylindrical body 20, a piston 40, at least one fluid seal 50, a handle 60 and a nut 80.

The cylindrical body 20 is adapted to be connected between the inlet and the outlet of the pipe for controlling the flow of liquids/gases there through. Specifically, the cylindrical body 20 is threadably connected between the inlet and the outlet of the pipe by a connector for example a flange. More specifically, the cylindrical body 20 includes threadings (not numbered) configured on an internal diameter (not numbered) on both ends (not numbered) thereof for threadably fitting the connector on both ends thereof.

Figure 8A:
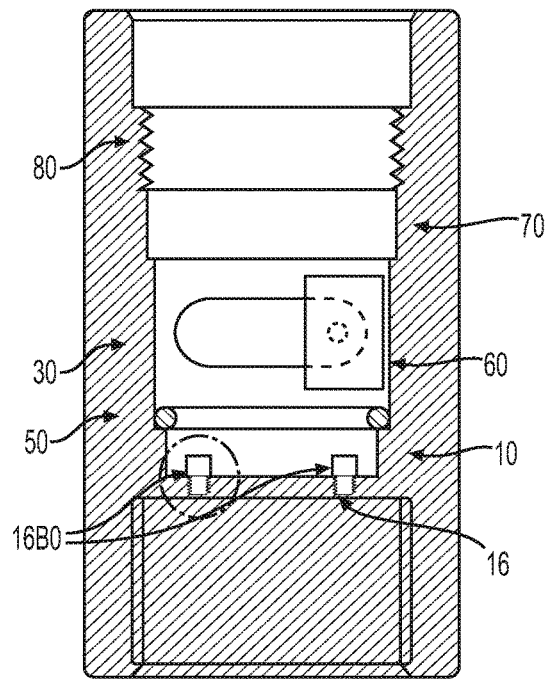
FIG. 8A shows a cross-sectional view of the flow control valve having the flying disc as the first disc, in accordance with an alternate embodiment of the present invention.
Figure 8B:
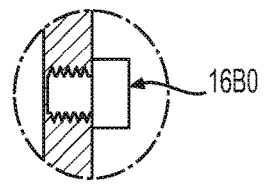
FIG. 8B shows a magnified view of a guide pin mounted on a bridge plate of the flow control valve of FIG. 8A.
Figure 8C:
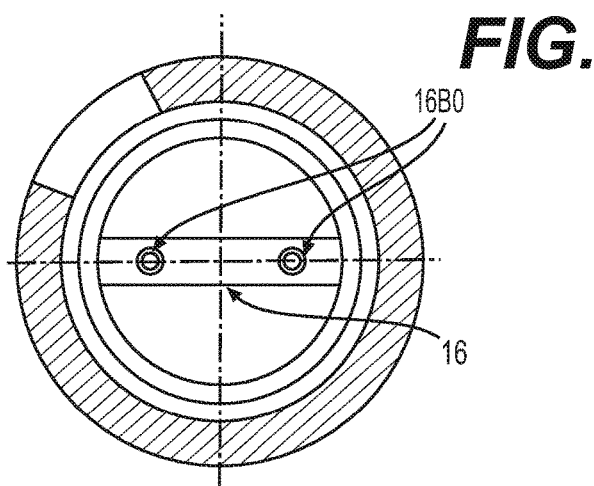
FIG. 8C shows a top view of a cylindrical body with the bridge plate and the guide pins of the flow control valve of FIG. 8A.

The cylindrical body 20 includes a slit 12 configured centrally thereon and a first disc/slice 14 (herein after 'the first disc 14') configured internally therein. The slit 12 is configured centrally on the cylindrical body 20 along 'x' axis to occupy only a quarter sector of an arc. Specifically, when the cylindrical body 20 is placed vertically, the slit 12 looks horizontal as shown in FIG. 8a. In an embodiment, the cylindrical body 20 and the first disc 14 are made of stainless steel or any other suitable material having good strength known in the art.

The first disc 14 is selected from any one of a stationary disc 14A and a flying/floating disc 14B and includes at least one cavity 10 configured therein. The stationary disc 14A is a non-movable disc while the flying disc 14B is capable of undergoing a reciprocating movement while restricting axial/rotary movement thereof. The flying disc 14B undergoes the reciprocating movement in response to an in-line fluid pressure. The flying disc 14B includes at least two guide holes 14B0 configured thereon. In case of the flying disc 14B, the cylindrical body 20 is designed to include a bridge plate 16. The bridge plate 16 includes at least two guide pins 16B0 fixed thereon for allowing the flying disc 14B to undergo reciprocating movement by sliding therein through the at least two holes 14B0. In an embodiment, the bridge plate 16 is a flat integral part of the cylindrical body 20 (refer FIG. 8A-FIG. 8C).

Specifically, the first disc 14 is configured on the internal diameter of the cylindrical body 20. More specifically, the first disc 14 is capable of being configured as a homogeneous/integral part of the cylindrical body 20 by a method such as a casting/machining method or is fixed on the cylindrical body 20 by a method selected from any one of interference fit, welding, resin binding method and the like. More particularly, the stationary disc 14A is formed as an integral part of the cylindrical body 20 by the method such as casting/machining method and the flying disc 14B is fixed on the bridge plate 16, aligning the at least two guide holes 14B0 with the at least two guide pins 16B0, so as to allow sliding movement of the flying disc 14B.

The piston 40 is a hollow type cylinder fitted inside the cylindrical body 20 for moving therein. The piston 40 is capable of undergoing an axial movement inside the cylindrical body 20. The piston 40 includes a hole 32 configured centrally thereon and a second disc/slice 34 (hereinafter 'the second disc 34') configured internally therein such that when the piston 40 is fitted inside the cylindrical body 20 the hole 32 coincides with the slit 12 and the second disc 34 rests on the first disc 14 leaving a gap (not shown) there between. In an embodiment, there is a gap of 0.5 mm between the first disc 14 and the second disc 34. Specifically, the second disc 34 is configured as a homogeneous/integral part of the piston 40 by the method such as casting/machining method or is fixed on the piston 40 by any one of the interference fit, the welding, the resin binding method and the like.

The second disc 34 includes at least one cavity 30 configured therein corresponding to the at least one cavity 10 on the first disc 14. Specifically, the first disc 14 and the second disc 34 are flat circular metal discs having same number of cavities for controlling the flow of fluids/gases flowing there through in a precise manner. In an embodiment, the valve 100 with the discs 14, 34 having only one cavity is employed where an equal distribution of flow at the outlet is not required and in such cases the cavity is not covering more than 50% of the disc radially. In another embodiment, the valve 100 when used in a factory for example a paper factory where a lot of fluid is to be handled in a peculiar manner without dropping rate of flow and pressure includes the discs 14, 34 having multiple cavities such as two and four cavities spaced equidistantly as shown FIG. 6A and FIG. 6B. The multiple cavities may also vary in shape and size/s depending on the flow requirement and the end use.

Figure 9A:
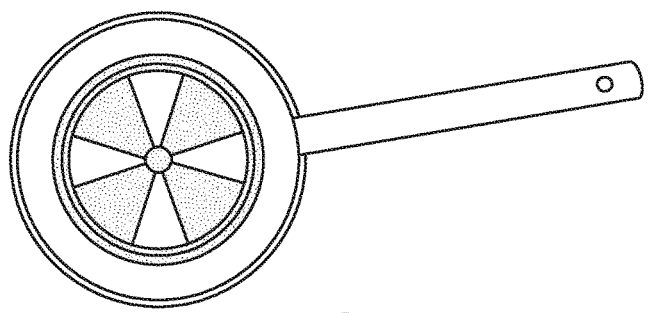
FIG. 9A shows a fully open state of the flow control valve, in accordance with the present invention.
Figure 9B:
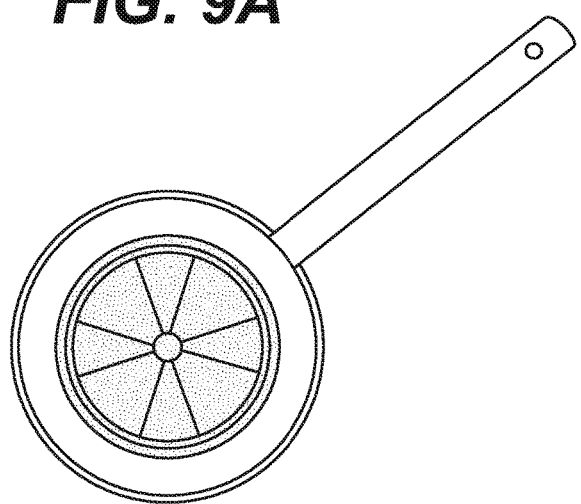
FIG. 9B shows a fully closed state of the flow control valve, in accordance with the present invention.
Figure 9C:
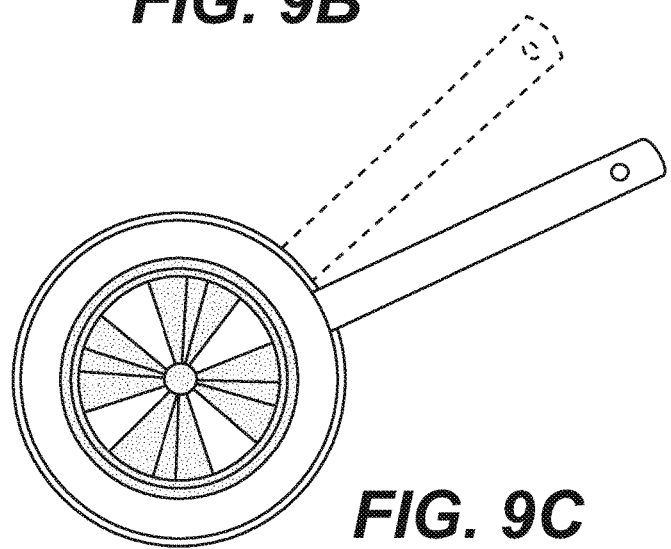
FIG. 9C shows a partially open state of the flow control valve, in accordance with the present invention.

The second disc 34 is capable of undergoing a circular movement in response to the movement of the piston 40. Thus, the movement of the second disc 34 is restricted to the movement of the piston 40. Due to the circular movement, the second disc 34 slides over the first disc 14 resulting in any one of partial alignment, complete alignment and complete misalignment of the at least one cavities 10, 30 with each other for controlling the flow of fluid/gas flowing there through from the inlet to the outlet of the pipe. The gap between the discs 14, 34 facilitates easy movement of the second disc 34. When the at least one cavities 10, 30 are completely aligned, the valve 100 is in a fully open state (refer FIG. 9A) to allow fluid/gas to flow at a controlled rate and when the at least one cavities 10, 30 are completely misaligned, the valve 100 is in a fully closed state (refer FIG. 9B) to prevent fluid/gas to flow thus controlling the fluid/gas flow. When the at least one cavities 10, 30 are partially aligned, the valve 100 is in a partially open state as shown in FIG. 9C.

The cylindrical body 20 and the piston 40 include the at least one fluid seal 50 (hereinafter 'the fluid seal 50') sandwiched there between to prevent leakage of fluids/gases therefrom. Specifically, the fluid seal 50 is positioned between the internal diameter of the cylindrical body 20 and the second disc 34 of the piston 40. In an embodiment, the fluid seal 50 is selected from any one of 'O' Ring, flat ring, 'U' cup seal and the like and is made of a material selected from any one of graphite, synthetic, resin bonded and any other suitable material known in the art depending on application.

The handle 60 is adapted for interconnecting the piston 40 with the cylindrical body 20 by passing through the slit 12 on the cylindrical body 20 into the hole 32 of the piston 40. Specifically, the handle 60 is threadbly fitted into the hole 32 of the piston 40 by passing through the slit 12 on the cylindrical body 20. However, it is understood that the handle 60 can be fitted in any other suitable ways known in the art. The handle 60 is capable of moved by any one of a manual means (not shown) and an actuator device (not shown) for moving the piston 40 therewith thereby resulting in the circular movement of the second disc 34. In an embodiment, the handle 60 is capable of being attached or replaced with a probe (not shown) or an actuator (not shown) for automation with an automated controller (not shown). The valve 100 is capable of being controlled precisely with the probe on the handle 60.

The axial load of the piston 40 is taken care by bearings 70 for example thrust bearings. The bearings 70 are threadbly positioned on top of the piston 40 inside the cylindrical body 20.

The nut 80, also known as pressure nut or lock nut is fixed on top of bearings 70 inside the cylindrical body 20. The nut 80 is adapted for locking the piston 40 inside the cylindrical body 20 thereby maintaining the location of the piston 40 inside the cylindrical body 20. Specifically, the nut 80 includes a round ring threading (not numbered) on an outer diameter (not numbered) thereof for threadbly fixing inside the cylindrical body 20) at a correct pressure. The facing of the nut 80 has fine finishing and includes a taper hole (not numbered) having a slit (not numbered) configured therein. The slit is given through a center of the taper hole to separate the sector from the circle of the nut 80 and hence to expand to lock the nut 80 in its place with a taper pin (not shown). The slit also gives elasticity to the nut 80 for withstanding high pressure and vibration.

ADVANTAGES OF THE INVENTION

1. The valve 100 is designed to operate under high pressure and extreme temperatures.
2. The valve 100 is capable of being used in bigger pipeline having bigger cross-section as well as in pipelines of fuel injection systems for rockets and space vehicles to discharge fluid with good force and equally distributing the flow and pressure from the at least one cavity at the outlet in all sides (360°).
3. The opening and closing of the valve 100 from 0 to 1 is achieved in just ¼ turn of the handle 60. The traverse of the handle 60 is even less in case of the discs 14, 34 with the multiple cavities. The opening and closing of the valve 100 is also capable of being easily interfaced by a screw or through automation using an electronic, a magnetic or a pneumatic system and the like.
4. There is no drop in line pressure when the valve 100 is in the fully open state. The opening of the valve flange would be the area of the cross section of the pipeline and hence flow is without fall in any pressure.
5. The valve 100 is capable of being operated at specific time interval.
6. The at least one cavity 10, 30 on the discs 14, 34 give improved flow which can further be increased by increasing the number of cavities for delivery as per requirement as opposed to presently used systems that suffer resistance in the flow because of change in direction of the flow for example, ball and gate valves in which the angle of flow gets shifted when the valve is not fully open.
7. The valve 100 is capable of creating combustion for air jackets, jets and the like. Optionally, a software program can be interfaced to show exactly how much pressure and delivery of fluid is going into an engine as well as to show the combustion in the engine continuously with the rate of acceleration and retardation like a tachometer.
8. The valve 100 is capable of being used in pneumatics and hydraulics, as a burner and distributor. Generally, the burner is a kind of system where fuel comes out same from all desired directions in equal amount of delivery (as pressure is applied). The fuel is transferred from an original state to further reaction. Pressurized fuel would surely amount to increase in efficacy.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the present invention.

We claim:

1. A flow control valve, comprising:
   (a) a cylindrical body having an internal surface with an internal diameter, an inlet, an outlet, and a window positioned centrally therein,
   (b) a first disc disposed within the internal diameter, the first disc comprising at least one first channel configured therein, wherein the first disc is a stationary disc or a flying disc;
   (c) a piston fitted within the internal diameter and configured for movement therein, the piston comprising
      (i) an opening configured centrally therein, the opening adapted to coincide with the window, and
      (ii) a second disc fitted internally therein, wherein the second disc is configured to partially rest on the first disc leaving a partial gap there between, wherein the second disc comprises at least one second channel therein, wherein the second disc is configured to rotate reversibly in response to movement of the piston from a position of partial alignment, complete alignment, or complete misalignment of the at least one second channel with the at least one first channel;
   (d) at least one fluid seal positioned between the internal diameter and the second disc;
   (e) a handle passing through the window into the opening, wherein the handle is configured for manual movement or movement by an actuator device configured to move the piston, thereby resulting in the rotation of the second disc; and
   (f) a nut defining a central opening, wherein the nut is configured as a ring, and wherein the nut locks the piston inside the cylindrical body by engaging the internal diameter,
   wherein the nut is fixed on top of bearings inside the cylindrical body, the bearings being threadably positioned on an end of the piston inside the cylindrical body.

2. The flow control valve of claim 1, wherein the cylindrical body comprises threads on at least part of the internal diameter for connection to a connector flange disposed on at least one end thereof for fitting the cylindrical body into a pipe inlet and a pipe outlet.

3. The flow control valve of claim 1, wherein the first disc is fixed within the internal diameter by a weld.

4. The flow control valve of claim 1, wherein the first disc is an integral part of the cylindrical body.

5. The flow control valve of claim 1, wherein the first disc is a flying disc comprising at least two guide holes configured therein, wherein the flying disc is configured to undergo a reciprocating movement in response to an in-line fluid pressure.

6. The flow control valve of claim 1, wherein the first disc is a flying disc, wherein the cylindrical body comprises a bridge plate, and wherein the bridge plate comprises at least two guide pins fixed thereon that direct reciprocating movement of the flying disc by sliding therein through at least two guide holes.

7. The flow control valve of claim 1, wherein the second disc is fixed within the internal diameter of the piston by a weld.

8. The flow control valve of claim 1, wherein the second disc is an integral part of the piston.

9. The flow control valve of claim 1, wherein the first disc and the second disc are flat circular metal discs.

10. The flow control valve of claim 1, wherein the first disc is fixed within the internal diameter of the cylindrical body by an interference fit or a resin.

11. The flow control valve of claim 1, wherein the second disc is fixed within the internal diameter of the piston by an interference fit or a resin.

* * * * *